United States Patent [19]

Estep et al.

[11] 3,920,424

[45] Nov. 18, 1975

[54] LIQUID SULPHUR GAS SCRUBBER APPARATUS

[75] Inventors: James W. Estep; Edward W. Plum, both of Calgary, Canada

[73] Assignee: Texasgulf Inc., New York, N.Y.

[22] Filed: Mar. 5, 1974

[21] Appl. No.: 448,298

Related U.S. Application Data

[60] Continuation-in-part of Ser. No. 227,047, Feb. 17, 1972, Pat. No. 3,807,141, which is a division of Ser. No. 115,648, Feb. 16, 1971, abandoned.

[52] U.S. Cl. .................................................. 55/193
[51] Int. Cl.² ............................................ B01D 53/00
[58] Field of Search ......... 55/36, 52, 159, 191, 192, 55/193, 183, 185, 229; 159/DIG. 30

[56] References Cited
UNITED STATES PATENTS

| | | | |
|---|---|---|---|
| 1,969,888 | 8/1934 | Gibson | 55/193 |
| 3,411,270 | 11/1968 | Cornelius et al. | 55/193 |
| 3,528,220 | 9/1970 | Walker et al. | 55/89 |
| 3,789,579 | 2/1974 | El-Hindi | 55/193 |

FOREIGN PATENTS OR APPLICATIONS

| | | | |
|---|---|---|---|
| 160,157 | 3/1964 | U.S.S.R. | 55/193 |
| 905,183 | 9/1962 | United Kingdom | 55/193 |

*Primary Examiner*—Charles N. Hart

[57] ABSTRACT

A liquid sulphur gas scrubber apparatus for removing hydrogen sulphide and polysulphides from liquid sulphur disposed in an enclosed reservoir. The apparatus comprises an outer casing extending upwardly from the reservoir in which a liquid sulphur downflow passage means is disposed. Downwardly canted baffle plates extending into the passage means in alternating fashion in opposing directions provide a cascade type downflow path which agitates the liquid sulphur and causes the release of sulphide gas therefrom. This gas is vented from the apparatus by means of openings disposed below the baffle plates and gas discharge and venting passages provided in the casing. Supply means for pumping liquid sulphur from the reservoir to the uppermost baffle plate in the downflow passage means is also provided.

7 Claims, 5 Drawing Figures

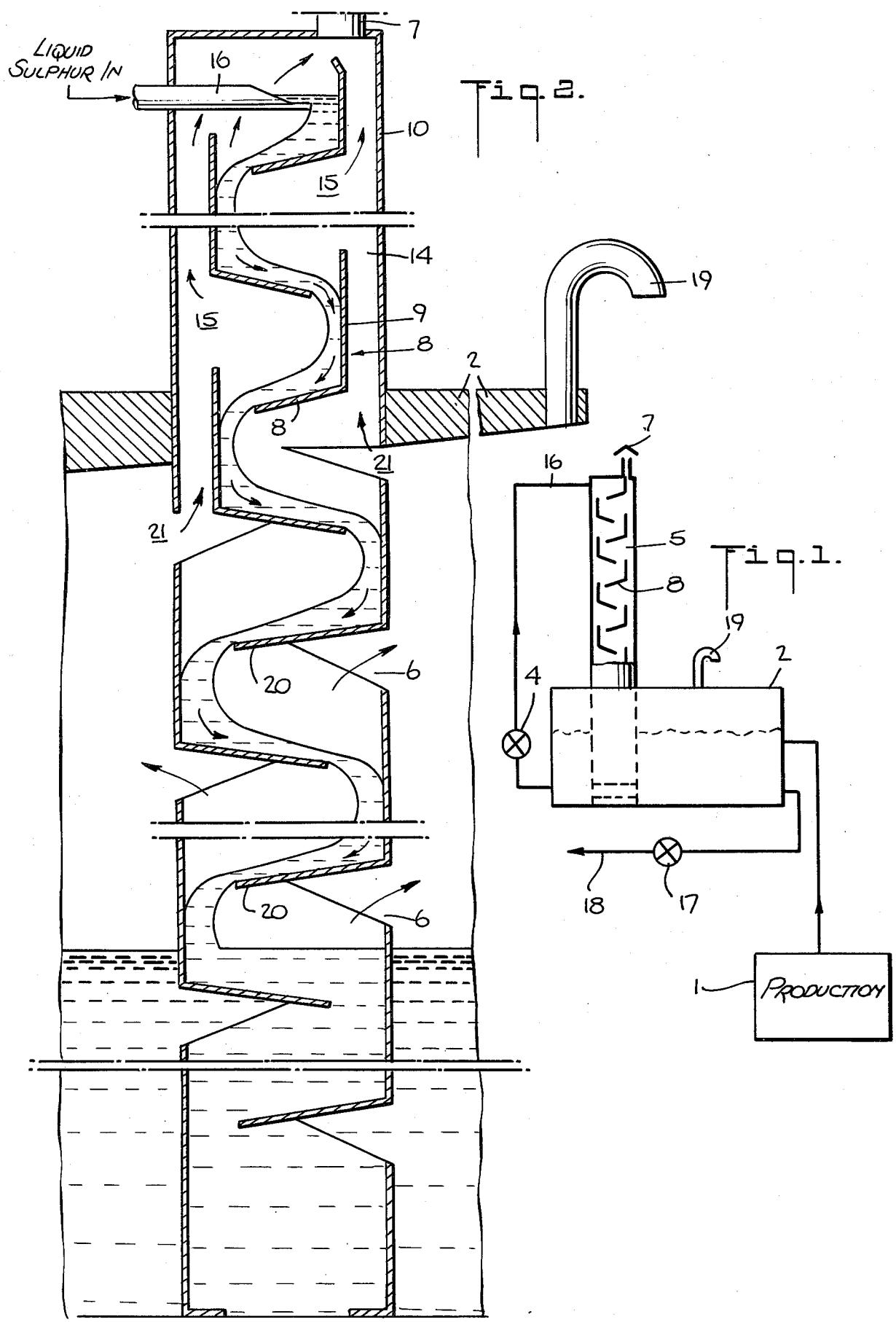

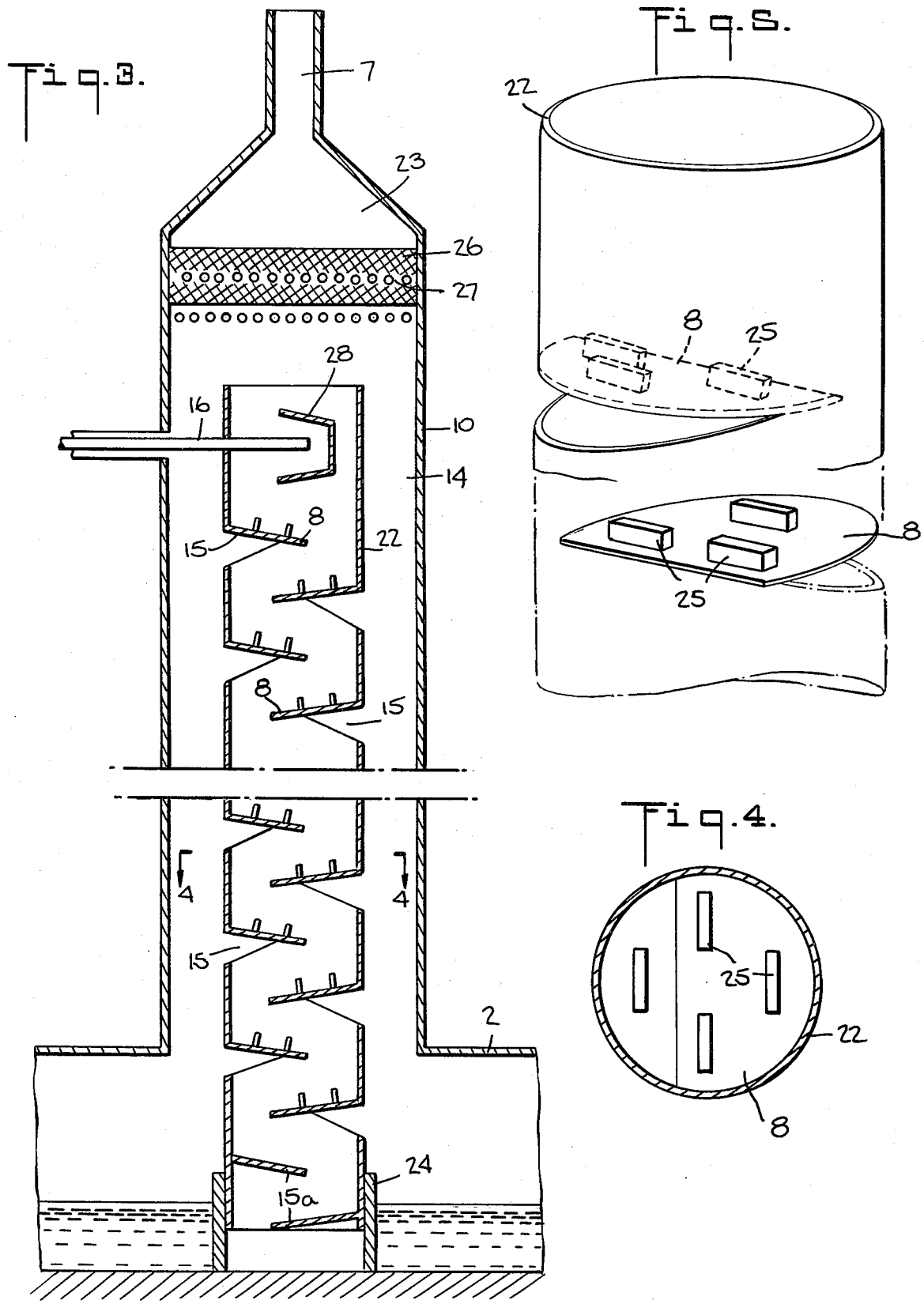

LIQUID SULPHUR GAS SCRUBBER APPARATUS

This application is a continuation-in-part of application Ser. No. 227,047 filed on Feb. 17, 1972, now U.S. Pat. No. 3,807,141 which is a division of application Ser. No. 115,648 now abandoned filed on Feb. 16, 1971.

BACKGROUND OF THE INVENTION

1. Field Of The Invention

This invention relates to an apparatus for removing hydrogen sulphide and polysulphides in liquid sulphur subsequent to production of liquid sulphur by the Claus process.

2. Description of The Prior Art

As is well known, liquid sulphur can be produced in the Claus process by passing hydrogen sulphide ($H_2S$) through a combustion chamber where most of the hydrogen sulphide is burned to produce sulphur and in such a manner that approximately one-third of the remaining volume of hydrogen sulphide is converted into sulphur dioxide. After cooling, hydrogen sulphide and sulphur dioxide are passed through a catalyst converter where the hydrogen sulphide and sulphur dioxide react to form liquid sulphur and water.

Liquid sulphur prepared by this process often contains liquid hydrogen polysulphides as impurities [$H_2S$ (gas) + (X−1)S (liquid)$\rightleftharpoons H_2S_x$ (liquid)]. The liquid polysulphides will slowly decompose and evolve as $H_2S$ gas over a period of time to create danger to equipment and the health of employees. If the liquid sulphur is shipped without removing the impurities and they gradually evolve as $H_2S$ during shipment, sufficiently high levels of hydrogen sulphide may be evolved and under certain conditions an explosion might occur. Similarly, the escaping gas evolved during shipment could endanger workmen when the container is opened.

Previous attempts at reducing the hydrogen sulphide content of liquid sulphur have usually involved more complicated processes, impractical for commercial operations. For example, in U.S. Pat. No. 3,364,655 a process is described in which liquid sulphur is degasified by atomizing liquid sulphur. By the process taught by this patent ammonia is added and the temperature of the liquid sulphur cooled to approximately 125°C. The liquid sulphur then is atomized by passage through nozzles of approximately 7mm. in diameter. While this system may be used on a small scale, it would have inherent problems when practiced on the large commercial scale as contemplated by our invention. Not only are the nozzles of small capacity and thus limiting production to a small scale but the necessity of adding ammonia introduces another ingredient which may react to form stable ammonia polysulphide which would be a contaminant in the liquid sulphur, especially if the liquid sulphur is subsequently used to manufacture sulphuric acid. The need to cool the liquid sulphur requires additional cooling equipment, another disadvantage. Finally, no mention is made in the prior art of the hydrogen polysulphide problem and the need to remove the same.

SUMMARY OF THE INVENTION

It is therefore an object of the invention to provide a liquid sulphur gas scrubber apparatus which obviates the dangers of the shipment and storage of liquid sulphur by removing substantially all the hydrogen sulphide and dissolved hydrogen polysulphides in the liquid sulphur.

This and other objects are achieved by a liquid gas scrubber apparatus comprising an elongated outer casing which is communicative with and extends vertically upwardly from an enclosed reservoir of liquid sulphur, and a liquid sulphur downflow passage means disposed within the casing and extending downwardly into the reservoir. Openings are provided in opposing sides of the passage means in an offset arrangement for venting gas from the downflow passage means into an annular gas venting passage defined by the casing and passage means, and externally of the casing through a gas discharge passage provided therein. A plurality of vertically spaced apart downwardly canted baffle plates extend inwardly into the passage means above each of the openings therein and overlap the innermost edge of the next lower adjacent baffle so as to provide a cascade downflow path for the liquid sulphur in the passage means. Means are also provided for supplying liquid sulphur from the reservoir to the vertically uppermost of the baffle plates.

BRIEF DESCRIPTION OF THE DRAWINGS

Other features and objects of the invention will become apparent in the following description, claims, and in the drawings in which:

FIG. 1 is a schematic flow diagram of one embodiment of the process of this invention;

FIG. 2 is a cross-sectional view of one embodiment of a gas scrubber apparatus constructed according to the invention;

FIG. 3 is a cross-sectional view of another embodiment of a gas scrubber apparatus constructed according to the invention;

FIG. 4 is a cross-sectional view of the downflow passage of the apparatus taken along section 4—4 of FIG. 3; and FIG. 5 is a perspective view of the downflow passage of the apparatus of FIG. 3.

DETAILED DESCRIPTION

Referring now to the drawings, specifically FIG. 1, liquid sulphur at approximately 280°F. and containing hydrogen polysulphides is pumped from a Claus process production facility 1 through appropriate piping to a large enclosed reservoir illustrated as storage tank 2. This tank may be of any size and in one embodiment is a 13,000 long ton storage tank in which the liquid sulphur is stored at atmospheric pressure and 280°F. By the practice of this invention the equilibrium between hydrogen polysulphide, hydrogen sulphide and liquid sulphur is shifted and the hydrogen polysulphides will decompose to form hydrogen sulphide and liquid sulphur as follows: $H_2S_x$ (liquid)$\rightleftharpoons H_2S \uparrow$ (gas) + (X−1)S (liquid). In order to provide agitation for removing the entrapped hydrogen sulphide, a vertical gas scrubber apparatus 5 is mounted within tank 2 in such a manner that it is communicative with and extends from the bottom of tank 2 vertically upwardly through and beyond the top of tank 2 as shown in FIGS. 1 and 2. After the tank has been partially filled, the liquid sulphur stored in the tank is continuously pumped from the tank 2 by a liquid sulphur supply means illustrated as pump 4 and supply pipe 16 to the top of the scrubber apparatus 5 through pipe 16 where the liquid sulphur is then allowed to flow in cascade fashion over a series of staggered internal baffle plates 8.

In the embodiment of the apparatus illustrated in FIG. 2, a liquid sulphur downflow passage means is formed in the upper portion of apparatus 5 above tank 2 by a plurality of vertically disposed plates 9 to which baffle plates 8 are attached. The baffle plates are downwardly canted and overlap the innermost edge of the next lower adjacent baffle plate, so as to provide a cascade downflow path for the liquid sulphur. Openings 15 are provided in opposing sides of the downflow passage formed by plates 9 in an offset arrangement and are communicative with an annular gas venting passage 14 defined by plates 9 and an elongated outer casing 10 to which the plates 9 are attached. The casing is communicative with and extends upwardly from tank 2 and includes a gas discharge passage illustrated as vent and hood arrangement 7. Tank vents 19 are provided for venting gas from tank 2 to the atmosphere.

In the portion of the apparatus located within tank 2, the baffle plates 8 are composed of straight plates 20, one end of which is cut in an arc to match the shape of casing 10 and is attached directly to the inner sides of the casing by any conventional means. By designing the lower portion of the apparatus in this manner, the flow area of the sulphur is increased. These lower plates 20 continue to the bottom of apparatus 5 so that even when the sulphur in tank 2 is low the incoming sulphur is not allowed to fall free for more than one foot. This avoids static electrical charge buildup on the sulphur and possible spark ignition resulting in fire or explosion.

In the operation of the gas scrubber apparatus, liquid sulphur flows through pipe 16 down the side of plates 9 on to the pitched baffle plates 10 from one baffle plate to the next in a zigzag flow down the downflow passage formed in apparatus 5. This cascade downflow within the apparatus agitates the liquid, increases the surface area of the liquid sulphur and facilitates the breakdown of the hydrogen polysulphides into $H_2S$ and liquid sulphur. The $H_2S$ gas then escapes from the sulphur, passes through vent openings 6 provided in the lower portion of the casing within tank 2 and collects in the upper portion of the tank 2. Gas is vented from the tank through vents 19. Gas escaping from the liquid sulphur in the upper portion of the apparatus is vented by openings 15, passage 14, and vent and hood 7 externally of casing 10. After the liquid sulphur has passed through the scrubber apparatus 5 it spreads out over the surface of the liquid sulphur in the tank allowing more gaseous hydrogen sulphide to escape. Openings 21 are provided in casing 10 near the top of the tank to vent the hydrogen sulphide gas from the tank into passage 14. After sufficient treatment, the purified liquid sulphur in tank 2 is pumped from the tank by pump 17 through the appropriate piping 18 to tank cars or other suitable containers for shipment to the ultimate users.

Another alternative embodiment which can easily be adapted to this invention is to collect the escaping gas at vents 7 and 19 and recycle the gaseous hydrogen sulphide through the production facility 1 to convert this gaseous hydrogen sulphide into liquid sulphur.

The typical dimensions for the splash tower shown in FIG. 2 would be a tower of some 32 ft. in height of which 5 ft. protrudes above the top of the storage tank. The interior baffles could be approximately 16 in. in height with a vertical separation of 12 in. between each baffle at the center point of the tower. A typical slope for the horizontal surface of each baffle would be 1 in. per 11 in.

FIG. 3 illustrates a further embodiment of the gas scrubber apparatus in which the liquid sulphur downflow passage means comprises an elongated cylinder 22 coaxially disposed within casing 10. The cylinder terminates before the vertically upper end of casing 10 so as to form a chamber 23 at the upper end thereof. Openings 15 are provided in opposing sides of cylinder 22 in an offset arrangement and are communicative with the gas venting passage 14 defined between cylinder 22 and casing 10. The openings terminate in cylinder 22 above the minimum sulphur level in tank 2, but additional baffle plates 15a are disposed below the openings in cylinder 22, one below and one above the minimum liquid sulphur level of the tank, to prevent free fall of the sulphur for an excessive distance. Coupling means, illustrated as a discontinuous sleeve 24, couples cylinder 22 to the storage tank and the reservoir of liquid sulphur to the downflow passage therewithin. Each of baffle plates 8 is also provided with liquid sulphur downflow diversion means, illustrated as rectangular shaped plates 25, disposed in a staggered arrangement on the upper surface thereof. The plates further agitate the liquid sulphur flowing over the baffle plates and increase the surface area thereof to facilitate the release of gas.

Chamber 23 contains means for separating entrained vapors from escaping gas, illustrated as demister pad 26. Means for heating the demister pad, illustrated as steam coils 27, are also provided, and serve to remove condensed liquid sulphur collected on pad 26 and return it to the reservoir in tank 2. As in the previous embodiment of the invention means for supplying liquid sulphur to the uppermost baffle plate is provided and includes supply pipe 16 and a U-shaped baffle plate 28. Steam tracing and insulation is also provided in casing 10.

In an illustrative embodiment of the gas scurbber apparatus shown in FIGS. 3 – 5, the cross-sectional area of casing 10 with respect to the cross-sectional area of cylinder 22 could have a ratio of approximately 3:1. Gas discharge passage 7 would be approximately 20 feet in length; cylinder 22 approximately 36 feet long; and plates 25 approximately 3 inches in vertical height and 6 inches in horizontal length, and spaced apart by a distance of approximately 6 inches. The operation of this embodiment of the scrubber apparatus is substantially the same as that illustrated in FIG. 2.

In order to determine the effectiveness of this invention in reducing hydrogen sulphide and polysulphide in liquid sulphur, the following tests were conducted by bubbling nitrogen through a weighed sample of sulphur, then passing the nitrogen through an absorption train consisting of a magnesium perchlorate drier, then followed by passage through an activated copper phosphate hydrogen sulphide absorber. When tested by this process the following example illustrates the effectiveness of this invention in reducing hydrogen polysulphide in liquid sulphur. Liquid sulphur samples taken from the 13,000 long ton storage tank prior to treatment in the scrubber or splash tower, when analyzed for equivalent hydrogen sulphide content according to the process described above, have been found to contain between 170 ppm (parts per million) and 218 ppm. After aging for 4 days and one pass through the splash tower, the equivalent hydrogen sulphide content of the liquid sulphur had been reduced to between 46 and 39 ppm. By continuously passing the liquid sulphur through the splash tower, the equivalent hydrogen sulphide content of the liquid sulphur can be reduced even further.

As a further illustration of the effectiveness of our process, liquid sulphur which had been pretreated in accordance with this invention and shipped in a sealed tank car for a period of 8 days evolved hydrogen sulphide at the rate of 1.88 cubic feet per long ton. Liquid sulphur which had not been treated according to this invention but was shipped directly from the production facility in a sealed tank car for the same amount of time, evolved hydrogen sulphide at the rate of 4.99 cubic feet per long ton. This marked reduction in equivalent hydrogen sulphide was accomplished by only one passage throuogh through splash tower.

While the illustrated embodiments of the invention use a continuous circulation of the liquid sulphur during storage, another alternative embodiment which we have found most advantageous is to use two tanks. In one tank the material is stored for a period of 1 to 8 days during which time the hydrogen sulphide slowly evolves and is vented into the atmosphere. After this storage period the liquid sulphur is then pumped to a second tank which includes the described gas scrubber apparatus. While the liquid sulphur is in this second tank it is circulated through the splash tower for a sufficient period of time to circulate all the material at least twice. In this manner the hydrogen polysulphide content can be similarly reduced to sufficiently low levels to provide for safe handling during storage and shipment.

In the foregoing, the invention has been described with reference to specific exemplary embodiments thereof. It will be evident, however, that variations and modifications may be made thereto by those skilled in the art without departing from the spirit and scope of the invention.

What is claimed is:

1. A liquid sulphur gas scrubber apparatus for removing hydrogen sulphide and polysulphides from liquid sulphur disposed in an enclosed reservoir, comprising:
    an elongated outer casing communicative with and extending vertically upwardly from said reservoir and including a gas discharge passage for venting gas externally of said casing;
    liquid sulphur downflow passage means, disposed within said casing and extending downwardly into said reservoir, including a first plurality of spaced-apart openings disposed in one side of said passage means, and a second plurality of spaced-apart openings disposed in an opposing side thereof and offset with respect to said first plurality of openings, said casing and said passage means defining therebetween at least within a portion of said casing an annular gas venting passage communicative with said openings for venting gas from said passage means into said casing and externally of said casing through said gas discharge passage;
    a plurality of vertically spaced-apart, downwardly canted baffle plates, disposed in said passage means and extending inwardly thereinto above each of the openings of said first and second plurality of openings in alternating fashion, each of said plates extending into said passage means beyond the edge of the next lower adjacent baffle plate so as to form a cascade downflow path for the liquid sulphur in said passage means; and
    means, coupled to said reservoir and extending inwardly into said passage means, for supplying liquid sulphur from said reservoir to the vertically uppermost of said baffle plates, said liquid sulphur downflow passage means being formed by a elongated cylinder coaxially disposed within said outer casing and in the portion of said casing disposed above the reservoir by a plurality of vertically disposed plates disposed within and spaced apart from said casing so as to define said annular gas venting passage, and in the portion of said casing disposed within the reservoir by said casing.

2. The apparatus recited in claim 1, wherein said cylinder terminates before the upper end of said casing so as to form a chamber therewithin above said cylinder, and further comprising separating means disposed in said chamber for removing entrained vapors from gas vented externally of said casing through said gas discharge passage.

3. The apparatus recited in claim 2, wherein said separating means comprises a demister pad.

4. The apparatus recited in claim 2, further comprising means for heating said separating means and thereby causing removal of condensed liquid sulphur collected on said separating means and return thereof to the reservoir.

5. The apparatus recited in claim 4, wherein said heating means comprises steam coils disposed in said chamber adjacent said separating means.

6. The apparatus recited in claim 1, further comprising liquid sulphur downflow diversion means, disposed on said baffle plates, for agitating liquid sulphur flowing in said downflow passage means.

7. The apparatus recited in claim 6, wherein said diversion means comprises a plurality of upwardly extending plates disposed in a staggered arrangement on the upper surface of each of said baffle plates.

* * * * *